United States Patent [19]

Takiguchi

[11] Patent Number: 5,130,935
[45] Date of Patent: Jul. 14, 1992

[54] COLOR IMAGE PROCESSING APPARATUS FOR EXTRACTING IMAGE DATA HAVING PREDETERMINED COLOR INFORMATION FROM AMONG INPUTTED IMAGE DATA AND FOR CORRECTING INPUTTED IMAGE DATA IN RESPONSE TO THE EXTRACTED IMAGE DATA

[75] Inventor: Hideo Takiguchi, Yokohama, Japan

[73] Assignee: Canon Kabushiki Kaisha, Tokyo, Japan

[21] Appl. No.: 408,424

[22] Filed: Sep. 14, 1989

Related U.S. Application Data

[63] Continuation of Ser. No. 30,618, Mar. 27, 1987, abandoned.

[30] Foreign Application Priority Data

Mar. 31, 1986 [JP] Japan .............................. 61-071345
May 30, 1986 [JP] Japan .............................. 61-123701

[51] Int. Cl.$^5$ .......................... G01J 3/50; G01N 21/27
[52] U.S. Cl. ................... 364/526; 364/571.02; 356/407; 358/80; 382/17
[58] Field of Search ............. 364/526, 570, 571.02; 340/701; 382/17, 19; 358/75, 80; 356/407, 408

[56] References Cited

U.S. PATENT DOCUMENTS

| | | | |
|---|---|---|---|
| 4,539,647 | 9/1985 | Kaneko et al. | 364/526 |
| 4,583,186 | 4/1986 | Davis et al. | 364/526 |
| 4,623,973 | 11/1986 | Hoffrichter et al. | 364/526 |
| 4,653,014 | 3/1987 | Mikami et al. | 364/526 |
| 4,685,071 | 8/1987 | Lee | 364/526 |
| 4,689,669 | 8/1987 | Hoshino et al. | 364/526 |
| 4,694,330 | 9/1987 | Tanaka et al. | 358/80 |
| 4,703,441 | 10/1987 | Kishi et al. | 364/526 |
| 4,731,662 | 3/1988 | Udagawa et al. | 358/75 |
| 4,884,221 | 11/1989 | Sugiyama et al. | 356/407 |

FOREIGN PATENT DOCUMENTS

| | | | |
|---|---|---|---|
| 60-10133 | 1/1985 | Japan | 364/526 |
| 60-257328 | 12/1985 | Japan | 364/526 |

Primary Examiner—Joseph L. Dixon
Attorney, Agent, or Firm—Fitzpatrick, Cella, Harper & Scinto

[57] ABSTRACT

A color image processing apparatus generates color image data, measures the quantity of the image data within a predetermined region of color space, obtains a representative color value for the image data within that region, and corrects the color image data based on the representative value and the measured quantity.

The number of image data which exist within a predetermined region on a (u,v), chromaticity diagram and which are among input color image data is counted. When the counted number is smaller than a predetermined value, the correcting operation is not executed. The difference between a predetermined coordinate point and a coordinate point at which the largest counted number of image data exist is obtained, and by the obtained distance either all the image data or the image data within the predetermined region are corrected.

30 Claims, 8 Drawing Sheets

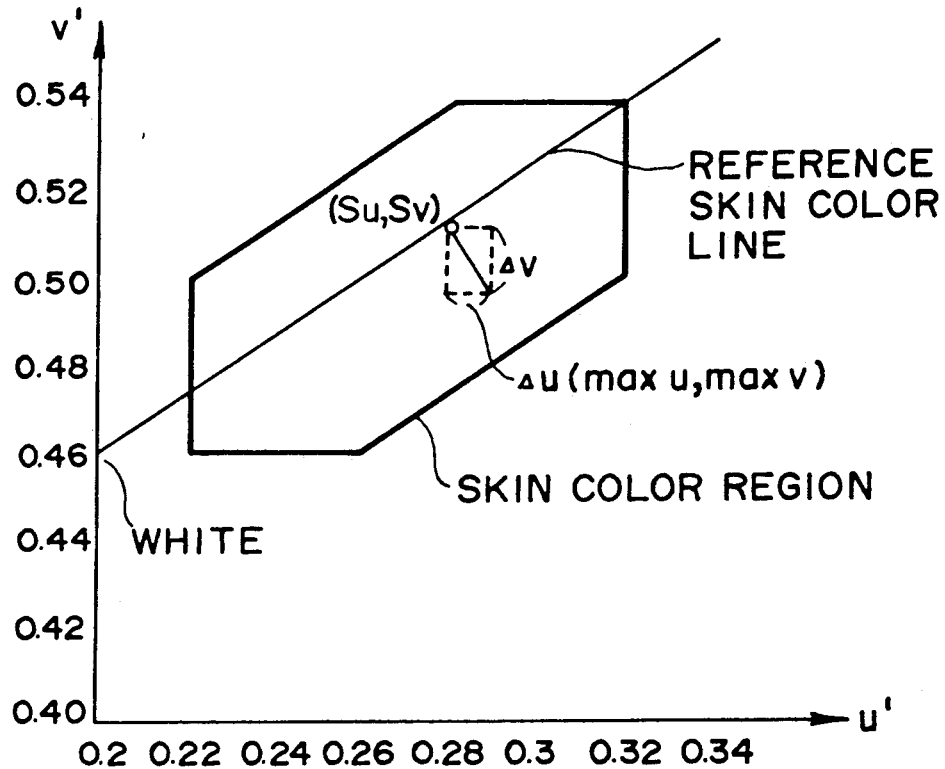
F I G. 2
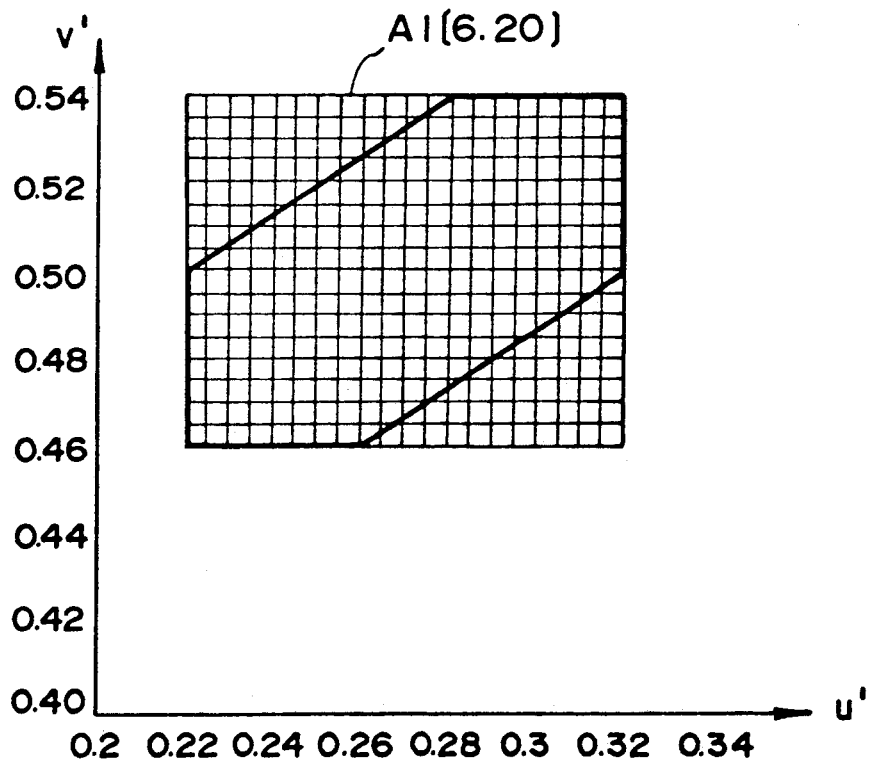
F I G. 3

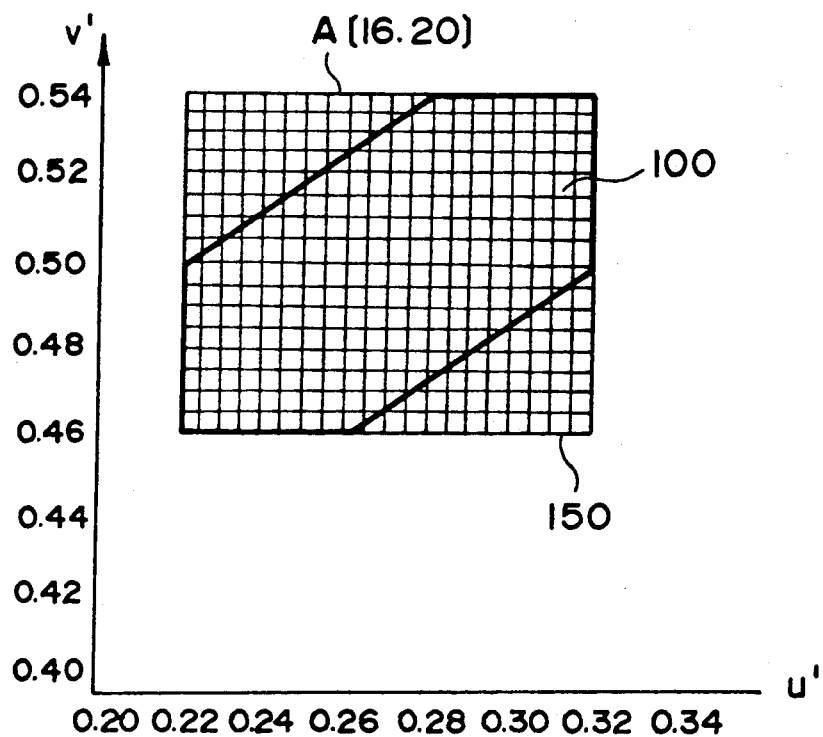
F I G. 9
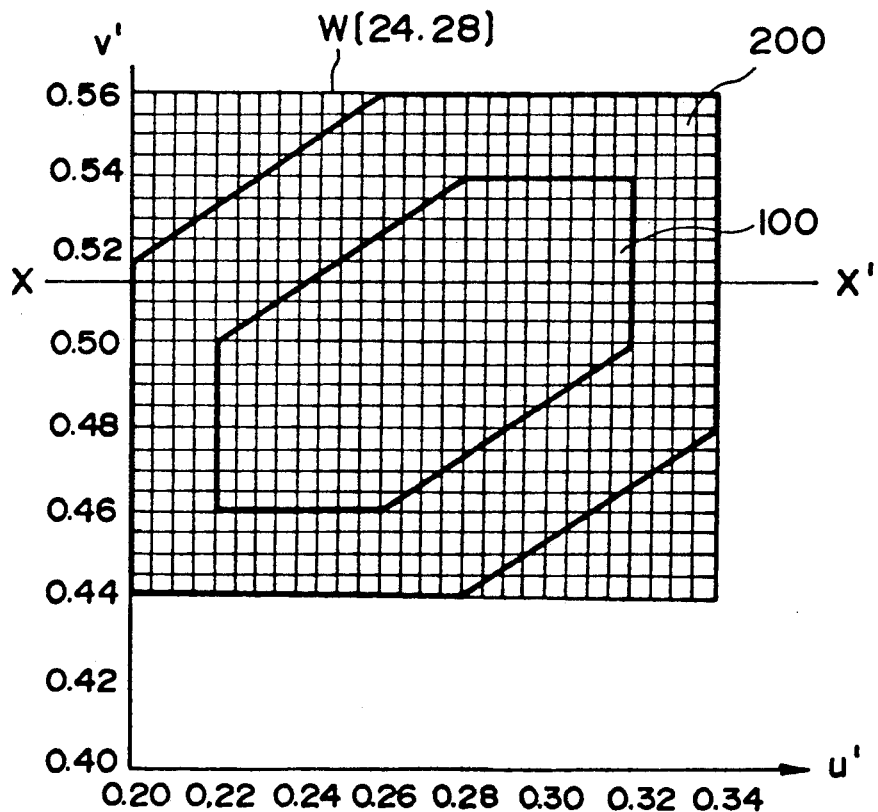
F I G. 10A

COLOR IMAGE PROCESSING APPARATUS FOR EXTRACTING IMAGE DATA HAVING PREDETERMINED COLOR INFORMATION FROM AMONG INPUTTED IMAGE DATA AND FOR CORRECTING INPUTTED IMAGE DATA IN RESPONSE TO THE EXTRACTED IMAGE DATA

This application is a continuation of application Ser. No. 07/030,618 filed Mar. 27, 1987 now abandoned.

BACKGROUND OF THE INVENTION

1. Field of the Invention

The present invention relates to a color image processing apparatus and particularly to such an apparatus performing color correction.

2. Related Background Art

Color correction of an image has been adopted in the field of printing or the like. For instance, if the skin color of a human is reproduced with a light green tinge, it is necessary to correct it to a more desirable skin color. However, whether the correction is to be carried out or the amount of correction has been mostly dependent upon experience and intuition. Such a problem arises not only with respect to the color of skin but also with respect to color of sky and the like.

SUMMARY OF THE INVENTION

The present invention has been made in view of the above problem. It is therefore an object of the present invention to provide a color image processing apparatus capable of performing an optimum color correction.

According to an aspect of the present invention, it is checked if a predetermined color is included in an original image and if the color exceeds in quantity a certain value. If the original includes such a color exceeding a certain value, a correction quantity is determined to perform color correction of the original.

According to another aspect of the present invention, a skin color, which is a most distinguishing color among colors of an original, is made an object of processing. If a skin color exceeding in quantity a certain value is included in an original, a correction quantity is determined to automatically perform color correction of the tone of an overall original image, with emphasis upon a skin color.

The above and other objects of the present invention will become apparent from the following detailed description taken in conjunction with the accompanying drawings.

BRIEF DESCRIPTION OF THE DRAWINGS

FIG. 2 is a u'-v' chromatically diagram wherein a skin color region and a reference skin color line are defined;

FIG. 3 shows an example of a matrix arrangement of the skin color region shown in FIG. 2;

FIG. 9 shows a quantized matrix arrangement of the skin color region shown in FIG. 8;

FIG. 10A illustrates a mutual position between the skin color region and an adjustment region;

DETAILED DESCRIPTION OF THE PREFERRED EMBODIMENTS

Figure 1:
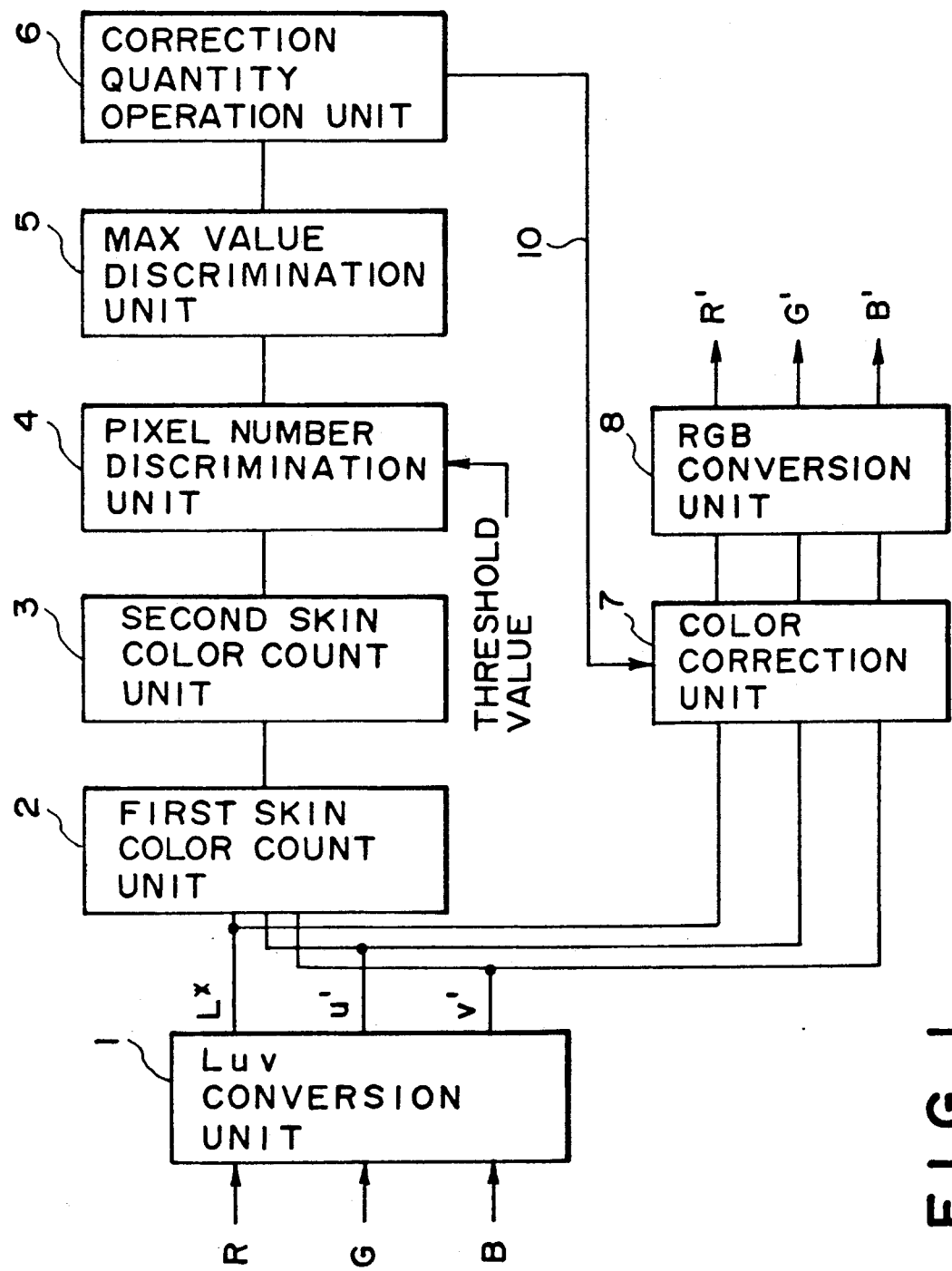
FIG. 1 is a block diagram showing an embodiment of a color image processing apparatus according to the present invention.

The invention will be described in detail with reference to the accompanying drawings. FIG. 1 is a block diagram showing a first embodiment of the present invention. A brief description of this embodiment will be given first The color image processing apparatus of FIG. 1 is provided with an Luv conversion unit 1, a first skin color count unit 2, a second skin color count unit 3, a pixel number discrimination unit 4, a maximum value discrimination unit 5, a correction quantity operation unit 6, a color correction unit 7, an RGB conversion unit 8, and a signal line 10. The color image processing apparatus of FIG. 4 is provided with a CPU 40, a RAM 42, a ROM 41, an image data input unit 43, and a color correction data output unit 44.

With the construction as above, first, red, green and blue (hereinafter referred to as RGB) values are obtained from an unrepresented image input device. The RGB values are converted into $L^*$, $u'$ and $v'$ values at the Luv conversion unit 1. The number of pixels, which pixels fall within the skin color region of a u'-v' chromaticity diagram, is counted by the first skin color count unit 2. Next, the numbers of pixels, which fall within respective elements of a matrix arrangement of the-skin color region of the u'-v' chromaticity diagram, are counted by the second skin color count unit 3. Then, the number of pixels falling within the skin color region is compared with a threshold value $\alpha$ at the pixel number discrimination unit 4. If the pixel number is less than $\alpha$, it is assumed that no skin color exists in the original or that the number of pixels of the skin color is small enough to terminate the procedure. If the pixel number is greater than or equal to $\alpha$, the element of the matrix arrangement, within which pixels fell at a maximum, is identified at the maximum value discrimination unit 5. A color difference between a reference skin color and the skin color corresponding to the element having a maximum number of pixels is determined to calculate a correction quantity at the correction quantity operation unit 6. This correction quantity is passed to the color correction unit 7 over the signal line 10. The color correction of the image is then performed using the correction quantity. The RGB values are obtained by an unrepresented image input device to convert them into $L^*$, $u'$ and $v'$ values at the Luv conversion unit 1. At the color correction unit 7, $L^*$ among the $L^*$, $u'$ and $v'$ values is used as it is, and the remaining $u'$ and $v'$ are corrected as $u' \leftarrow u' - \Delta^u$, and $v' \leftarrow v' - \Delta^v$. The corrected $L^*$, $u'$ and $v'$ values are converted back into RGB values at the RGB conversion unit 8 to obtain a color corrected image. The procedure is thus terminated.

Figure 4:
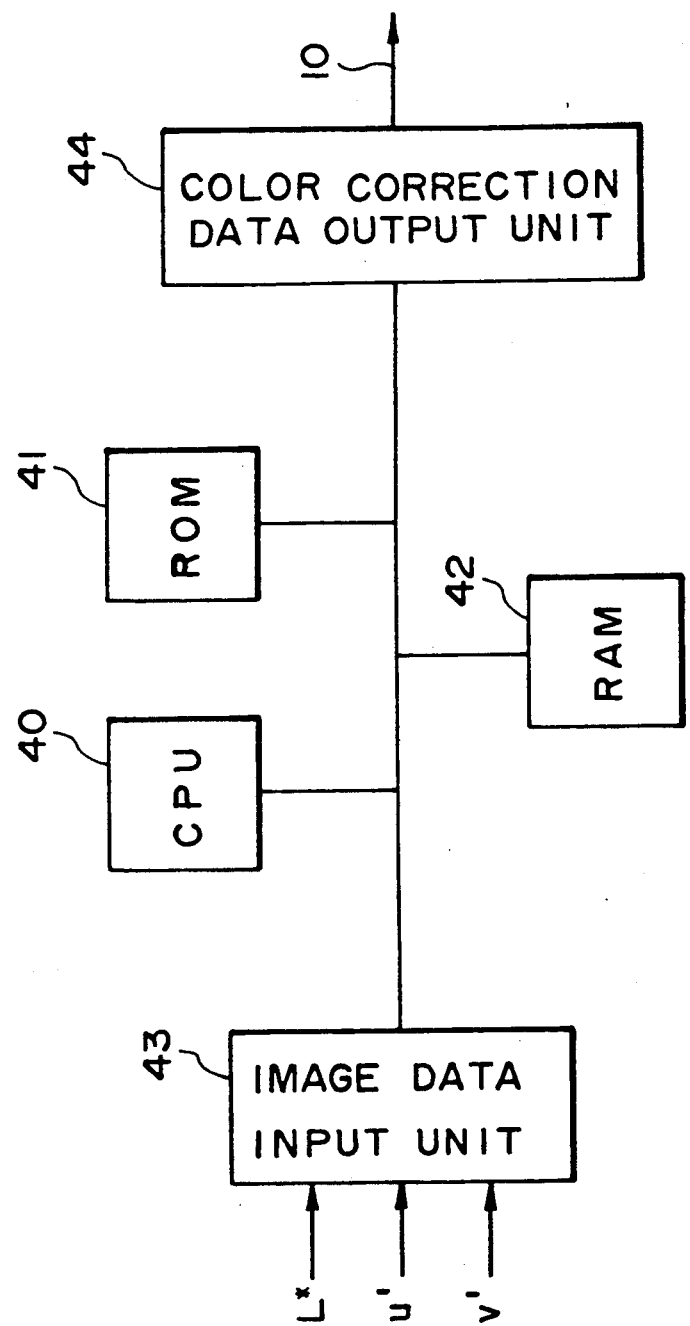
FIG. 4 is a block diagram showing another embodiment of a color image processing apparatus according to the present invention.

The block diagram of FIG. 4 shows an alternative using a computer in place of the first skin color count unit 2 through the correction quantity operation unit 6 in FIG. 4. Based on the $L^*$, $u'$ and $v'$ components input from the image data input unit 43, a correction quantity is calculated in accordance with a program as described with FIG. 5 under control of the CPU 40 using the RAM 42. The correction quantity is output to the color correction unit 7 via the color correction data output unit 44 over the signal line 10.

The brief description of the first embodiment has been given as above. The following is a detailed description therefor. FIG. 1 is a block diagram showing the first embodiment image processing apparatus. An image is assumed to be composed of RGB values. The circuit portion of FIG. 1 including the units 1 to extracts a skin color from an image and obtains a correction quantity, while the circuit portion including the units 7 and 8 performs color correction in accordance with the obtained correction quantity. First, the description will be directed to a procedure for extracting a skin color and obtaining a correction quantity.

First, RGB values are obtained from an original image using an unrepresented image input device. In this case, all of the pixels of the original are not needed, but the center portion of the original omitting its periphery can suffice even on the condition that every second or third pixel within the center portion be used. The reason for this is that a skin color such as that of a human face is located at the middle of an original in most cases. The RGB values thus obtained are converted into L*, u' and v' values at the Luv conversion unit 1. Then the number of pixels, which fall within the skin color region of the u'-v' chromaticity diagram shown in FIG. 2, is counted by the first skin color count unit 2. The skin color region in this embodiment is defined by u'-v' coordinates of (0.22, 0.46), (0.26, 0.46), (0.32, 0.50), (0.32, 0.54), (0.28, 0.54) and (0.22, 0.56), at a range of $30 \leq L^* \leq 80$. The skin color region is not limited thereto, and different values may be incorporated. Next, the numbers of pixels which fall within respective elements of a matrix arrangement of the skin color region as shown in FIG. 3 are counted by the second skin color count unit 3. In the matrix arrangement of this embodiment, the skin color region is divided in units of 0.05 into intervals in both the u' and v' directions to obtain a matrix A of [16, 20]. Then, the number of pixels falling within the skin color region is compared with a threshold value $\alpha$ at the pixel number discrimination unit 4. The threshold value $\alpha$ is preferably ¼ to 1/5 of the pixel number to be checked. If the pixel number is less than $\alpha$, it is assumed that no skin color exsits in the original or that the number of pixels of the skin color is small enough to terminate the procedure. If the pixel number is greater than or equal to $\alpha$, it is determined, at the maximum value discrimination unit 5 by obtaining the maximum values number of in the matrix A, which element of the matrix arrangement had maximum pixels. The values u' and v' of the element are represented using $<max>u$ and $<max>v$, respectively. A color difference between a reference skin color and the skin color corresponding to the element $<max>u$, $<max>v$ is obtainied at the correction quantity operation unit 6. The reference skin color is represented in this embodiment by a line, shown in FIG. 2, intersecting two coordinates 0.20, 0.46) and 0.32, 0.54). A color difference $(\Delta u, \Delta v)$ is obtained by $\Delta u = <max>\Delta u - su$ and $\Delta v = <max>v - sv$, wherein (su, sv) is an intersection of the reference skin color line with a perpendicular drawn from a coordinate $<max>u$, $<max>v$ toward the line. The values su and sv are obtained from the following equations.

Assuming that the reference skin color line is represented by $v = au + b_1$, a perpendicular drawn from a coordinate $<max>u$, $<max>v$ toward the line is represented by $v = 1/au + b_2$, wherein $b_2 = <max>v - 1/a<max>u$. Accordingly, the equations are given by:

$$su = (b_2 - b_1)/(a - 1/a)$$

$$sv = a.su + b_1$$

The obtained correction quantities $\Delta u$, $\Delta v$ are transferred to the color correction unit 7 over the signal line 10. Next, the entire image is subjected to color correction. The RGB values are obtained from an original image using an unrepresented image input device to convert them into L*, u' and v' values. At the color correction unit 7, L* among the L*, u' and v' values is used as it is, and the remaining u' and v' are corrected as $u' \leftarrow u' - \Delta u$, and $v' \leftarrow v' - \Delta v$. The corrected L*, u' and v' values are converted back into RGB values at the RGB conversion unit 8 to obtain a color-corrected image. The procedure is thus terminated.

The block diagram of FIG. 4 shows an alternative using a computer in place of the first skin color count unit 2 through the correction quantity operation unit 6 in FIG. 4. Based on the L*, u' and v' components input from the image data input unit 43, a correction quantity is calculated in accordance with a program under control of the CPU 40 using the RAM 42. The correction quantity is output to the color correction unit 7 via the color correction data output unit 44 over the signal line 10.

Figure 5:
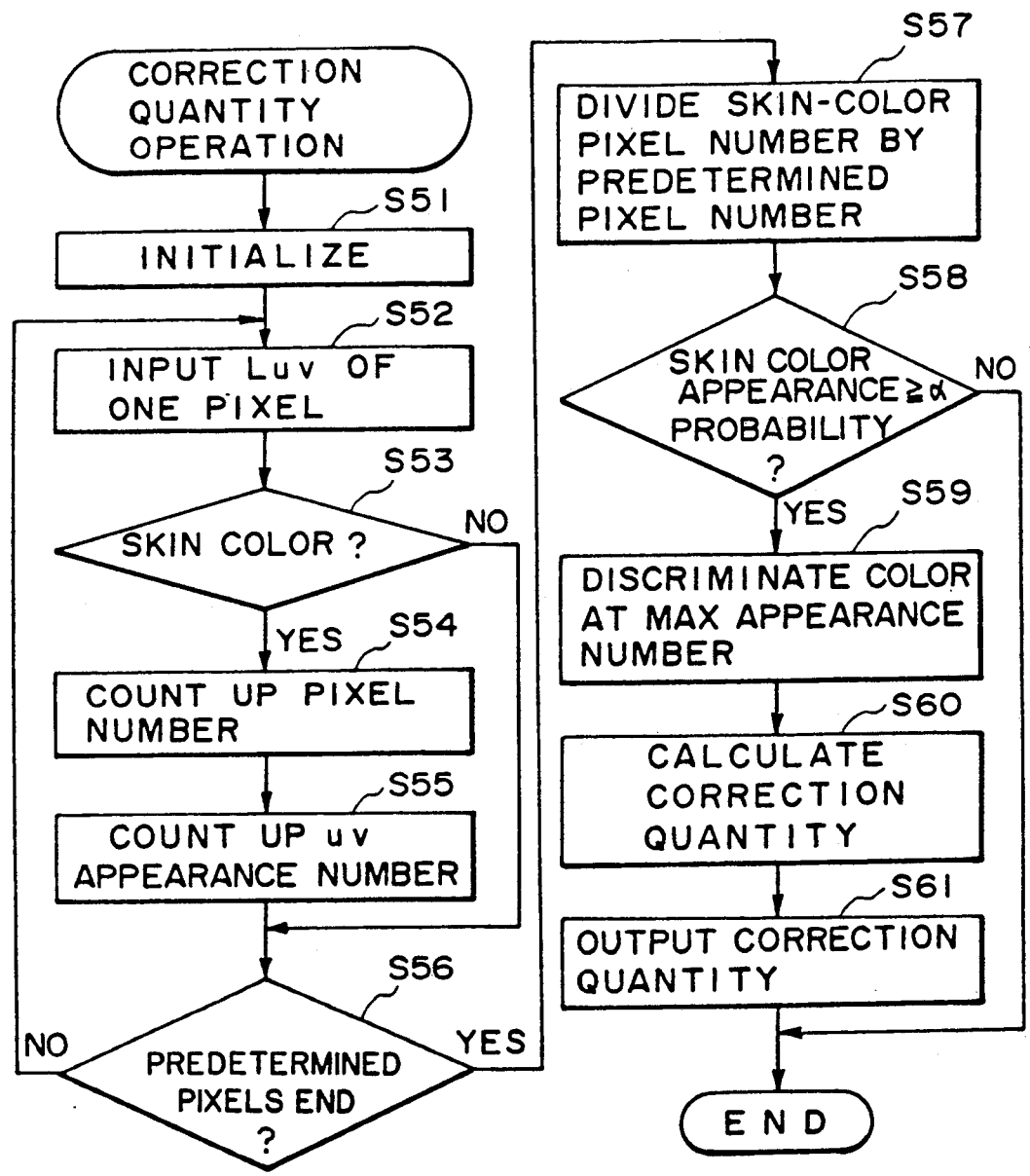
FIG. 5 is a flowchart explaining the operation of the color image processing apparatus shown in FIG. 4.

The operation of calculating a correction quantity will be described with reference to the flowchart of FIG. 5.

First, the RAM 42 and the like are initialized at step S51. L*, u' and v' components of a single pixel are received from the image data input unit 43 at step S52. It is checked at step S53 if the received pixel falls within the skin color region. If not, the flow skips to step S56. If it is a skin color within the region, the counter counting the number of skin color pixels is counted up by one at step S54. At step S55, the appearance number of pixels at the corresponding element in the matrix A 16, 20 of the u'-v' chromaticity diagram of FIG. 3 is counted up. It is judged at step S56 if all the pixels have been checked. If there still remain pixels to be checked, then the flow returns to step S52 and hence to step S56. It is noted that all of the pixels constituting an image need not be checked, as described previously. A skin color appearance probability is calculated at step S57. If the appearance probability is smaller than the threshold value $\alpha$, then it is judged at step S58 that a skin color exists to a less degree. On the other hand, if the skin color appearance probability is larger than the threshold $\alpha$, a skin color having a maximum appearance number is discriminated at step S59 in the u'-v' chromaticity diagram formed at step S55. A correction value, which is a deviation of the skin color now concerned from the reference skin color, is calculated at step S60 to output it at step S61 to the color correction unit 7 via the color correction data output unit 44 over the signal line 10. The calculation method of a correction quantity is the same as previously described.

Figure 6:
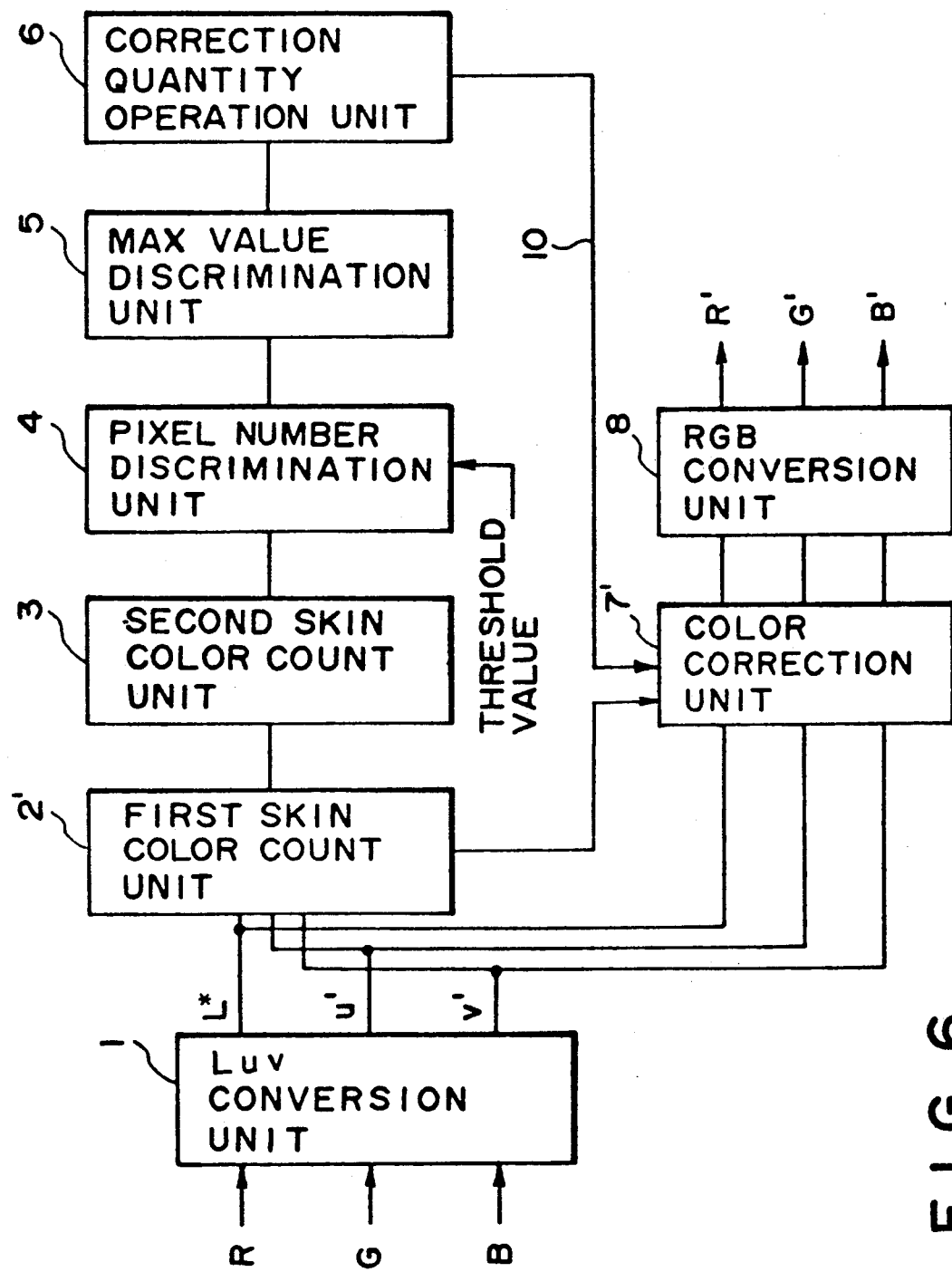
FIG. 6 is a block diagram showing another embodiment of the color image processing apparatus.

Next, a second embodiment of the present invention will be described. A basic block diagram is shown in FIG. 6 wherein units having a similar function to those in FIG. 1 have been represented using identical reference numerals, and the description, therefore is omitted.

Referring to FIG. 2, a first skin color count unit 2' counts the number of pixels falling within the skin color region defined on the u'-v' chromaticity diagram and outputs a signal for enabling color correction by a color correction unit 7' at a time when color correction is performed on the condition that the pixel concerned has been judged as a skin color. The color correction unit 7' performs color correction in response to a signal representative of a color correction quantity from the color correction quantity operaton unit 6 and in response to a signal from the first skin color count unit 2' which is representative of the fact that the pixel concerned has fallen within the skin color region. The color correction region 7' performs color correction with respect to the skin color region and its extended region, excluding the othner region.

The operation will be described below. First, the procedure of extracting a skin color and judging if color correction is to be performed will be described.

Figure 7:
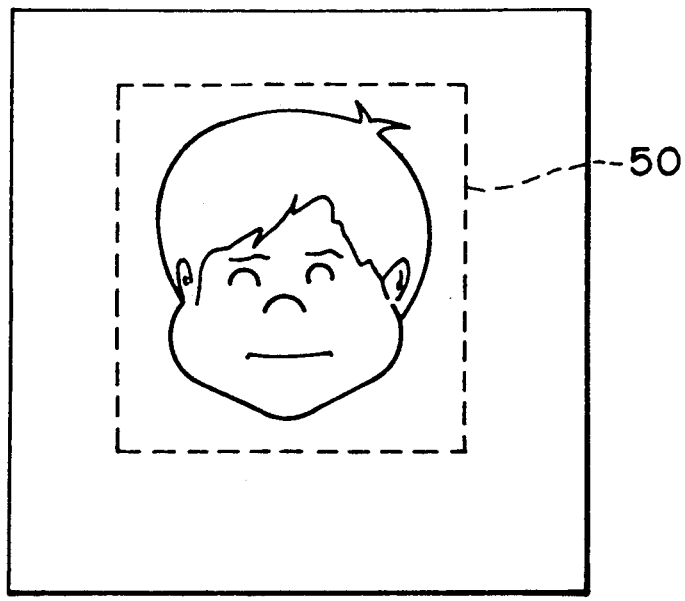
FIG. 7 shows an example of an image having a skin color.

First, RGB values are obtained from an original image using an unrepresented image input device. In this case, all of the pixels of the original are not needed in judging if color correction is to be performed, but the center portion (e.g. region 50 of FIG. 7) of the original omitting its periphery can suffice even on the condition that every second or third pixel within the center portion be used. One of the reasons for this is that in the color image processing apparatus whose object is reproducing a skin color since a skin color such as that of a human face is located at the middle of an original in most cases, as shown in FIG. 7, it is possible to use as its object region only the region 50 including a skin color in judging if color correction is to be performed. Another reason is that since a skin color changes abruptly, every second or third pixel may suffice. On the contrary, if an object to be corrected is not located at the center of an original, it is then necessary to use as a judgment region the entire image or the portion upon which an object color concentrates.

Figure 8:
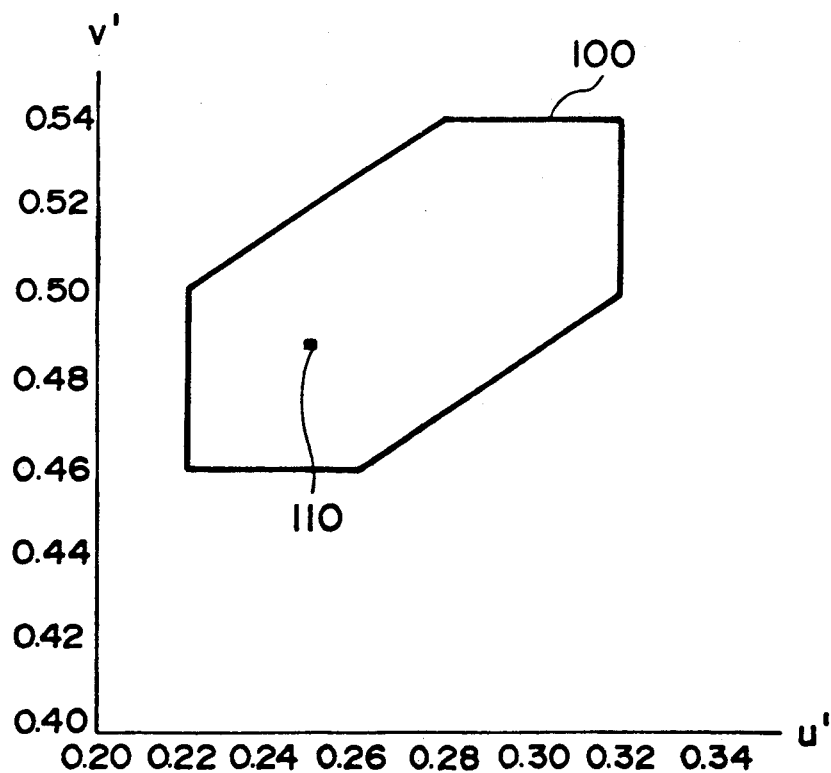
FIG. 8 is a u'-v' chromaticity diagram wherein skin color region and a reference skin color are defined.

The RGB values thus obtained are converted into L*, u' and v' values at the Luv conversion unit 1. Then, the number of pixels, which have a chromaticity within a skin color region 100 of the u'v' chromaticity diagram shown in FIG. 8, is counted by the first skin color count unit 2'. The counted number of pixels is used in judging if an image includes a number of pixels having a color to be corrected. The skin color region 100 in this embodiment is defined by u'-v' coordinates of 0.22, 0.46), 0.26, 0.46), 0.32, 0.50), (0.32, 0.54), (0.28, 0.54) and (0.22, 0.50), at a range of $30 \leq = L^* \leq 80$. The skin color region is not limited thereto, and different values may be incorporated.

Next, the numbers of pixels (u', v'), which fall within respective elements of a matrix arrangement 150 shown in FIG. 9 of the skin color region 100, is counted by the second skin color count unit 3 to obtain a frequency distribution of each pixel (u' v'). In the matrix arrangement shown in FIG. 9, the skin color region 100 is divided in units of 0.05 into in both the u' and v' directions to obtain a matrix A of [16, 20]. Then, the number of pixels falling within the skin color region 100, which number has been counted by the first skin color count unit 2', is compared with a threshold value $\beta$ at the pixel number discrimination unit 4. If the pixel number is less than $\beta$, it is assumed that no skin color exsits in the original or that the number of pixels of the skin color is small, so that it is not necessary to perform color correction. Thus, the correction quantity operation unit does not output any correction quantity on the signal line 10. The threshold value $\beta$ is preferably $\frac{1}{4}$ to 1/5 of the pixel number to be checked.

In the case where the pixel number is greater than or equal to $\beta$, the image concerned includes a plurality of pixels having a color to be corrected. Then, the max value discrimination unit 5 determines, by obtaining a maximum value in the matrix A from the frequency distribution obtained from the second skin color count unit 3, which element of the matrix arrangement had a maximum number of pixels having a chromaticity within the skin color region of FIG. 9. The values u' and v' of the element are represented using $<max>u$ and $<max>v$, respectively.

A color difference between a predetermined reference skin color 110 (stored color) and the skin color corresponding to the element $<max>u$, $<max>v$) is obtained at the correction quantity operation unit 6.

The reference skin color 110 is represented in this embodiment by a coordinate (u', v')=(0.2475, 0.4875). Then, the color difference ($\Delta u$, $\Delta v$) can be given by:

$$\Delta u = <max>u - 0.2475$$

$$\Delta v = <max>v - 0.4875$$

If an image is reproduced or printed as is, the skin color at pixel ($<max>u$, $<max>v$) becomes a color near to a skin color but apparently deteriorated in quality because of the characteristics of the image reading system. On the other hand the reference skin color represents a skin color in conformity with the printing-out system including the ink to be used. Consequently, the color difference ($\Delta u$, $\Delta v$) represents a distance between the potential skin color of an input image and the reference skin color. In this embodiment, the color difference ($\Delta u$, $\Delta v$) is used as a maximum correction quantity in performing color correction.

Figure 10B:
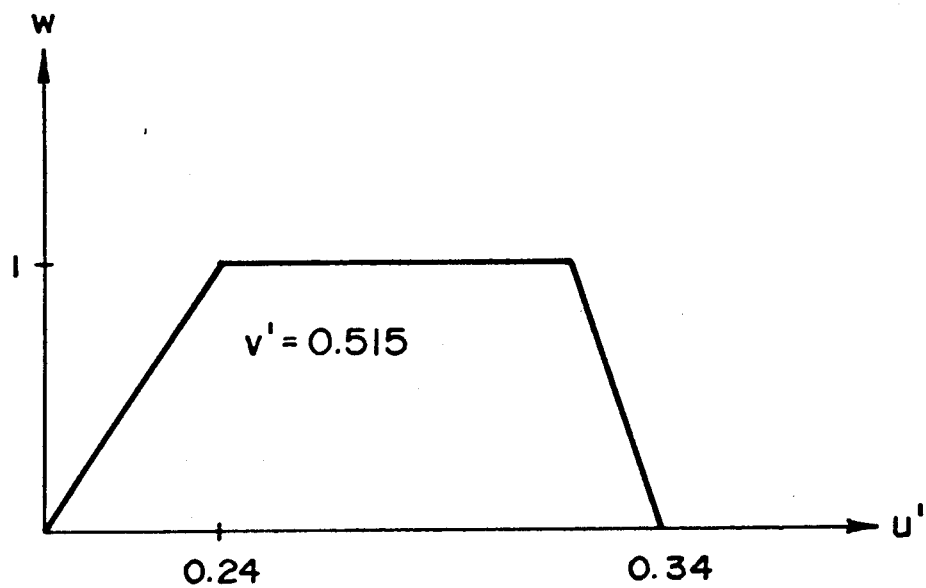
FIG. 10B shows an example of a weight graph.

Color correction is effected as in the following. One correction method is to correct all the pixels within the region 100 using uniformly the same correction quantity ($\Delta u$, $\Delta v$) for all of them. This method, however, loses "smoothness" of an image. In view of this, according to another method, the region as an object to be corrected is broadened to an extended region (correction region) 200 which is broader than the region (skin color region) 100, as shown in FIG. 10A. It is preferable that the extended region has a substantially similar configuration as to the region 100, for example as defined by coordinates (0.20, 0.44), (0.28, 0.44), (0.34, 0.48), (0.34, 0.56), (0.26, 0.56)and (0.20, 0.52). Using the color difference ($\Delta u$, $\Delta v$) as a maximum correction quantity, the elements falling within the extended region 200 are corrected to have a desired weight to thereby achieve "smoothness". As an example of weighting, a change of weight (w) on a line X—X' in FIG. 10A is shown in FIG. 10B. In particular, the weight (w) within the region 100 is made "1", while the weight within the extended region 2 and outside the region 100 is made to gradually reduce. Outside the extended region, the weight is obviously "0". Accordingly, the pixel after color correction is calculated as follows:

$$u' \rightarrow u' - \Delta u \cdot w(x, y)$$

$$v' \rightarrow v' - \Delta v \cdot w(x, y)$$

where $w(x, y)$ is an element of a matrix $w$ [24, 28] having the same element interval as that of the matrix A [16, 20] described previously.

The first skin color count unit 2' outputs a signal indicating if a pixel concerned falls within the skin color region 100, the extended region 200, or the other region. Based on this signal, the color correction unit 7' performs color correction using the color difference ($\Delta u$, $\Delta v$) for those pixels falling within the skin color region 100, using another color difference for each of the other pixels within the extended region 200 and outside the region 100, which color difference becomes gradually smaller as the pixels go away from the region 100. Those pixels falling outside the extended region 200 are not subjected to color correction.

Figure 11:
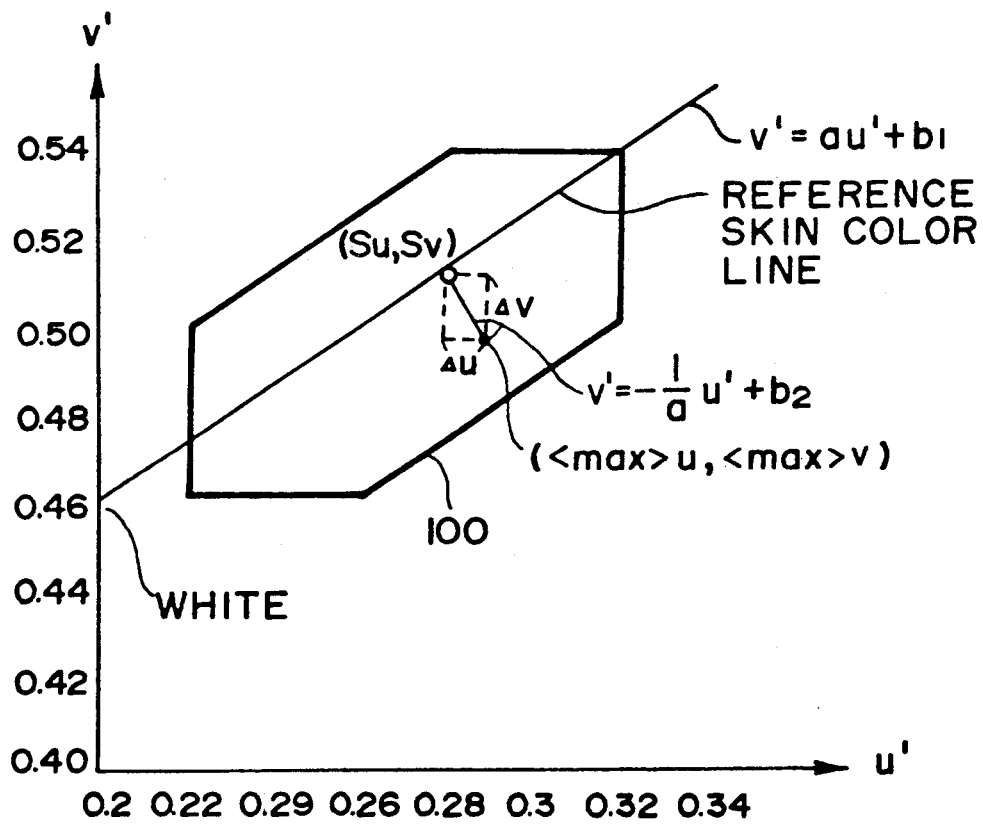
FIG. 11 illustrates a correction quantity determining method according to another embodiment.

Next, still another correction method will be given below. With this method, a reference skin color is not fixed at a coordinate (0.2475, 0.4875) but can have any color (su, sv) on a line intersecting two coordinates (0.20, 0.46) and (0.32, 0.54) as shown in FIG. 11. This line is a predetermined reference color line which can be considered experimentally as the most suitable line. A reference color on this line is determined based on the value ($<max>u$, $<max>v$) calculated from an input image. A color difference ($\Delta u$, $\Delta v$) is obtained by $\Delta u = <max>\Delta u - su$ and $\Delta v = <max>v - sv$, wherein (su, sv) is an intersection on the reference skin color line of a perpendicular drawn from a coordinate ($<max>u$, $<max>v$) toward the line. The values su and sv are obtained from the following equations.

Assuming that the reference skin color line is represented by $v = au + b_1$, a perpendicular drawn from a coordinate ($<max>u$, $<max>v$) toward the line is represented by $v = -(1/a)u + b_2$, wherein $b_2 = (<max>v - <max>u)$. Accordingly, the equations are given by:

$$su = (b_2 - b_1)/(a - (1/a))$$

$$sv = a.su + b_1$$

The determined correction quantity together with the weight as explained in FIGS. 10A and 10B is used for color correction to obtain a natural skin color. As compared with the method using a fixed reference skin color shown in FIG. 8 wherein a correction quantity will become excessive in a certain input image, the correction quantity most suitable for the skin color of an input image can be calculated with the method of FIG. 11, and in addition, there is no case where the correction quantity becomes too large.

After determining the correction quantity ($\Delta u$, $\Delta v$), it is output via the signal line 10 to the RGB values are converted into $L^*$, u' and v' by the Luv conversion unit 1. At the color correction unit 7, $L^*$ among the $L^*$, u' and v' values is used as it is, and the remaining u' and v' of the pixels falling within the skin color region and the extended region are corrected as u'←u'-$\Delta u$, and v'←v'-$\Delta v$. The corrected $L^*$, u' and v' values are converted back into RGB values at the RGB conversion unit 8 to obtain a color-corrected image. The procedure is thus terminated.

In the above embodiments, RGB values of an image are read twice at a time of determining a correction quantity and at a time of performing color correction. Since the color correction quantity can be considered as having a more or less fixed value to be determined from the characteristics of the image reading system and the image output system, it is possible to perform color correction in real time every time an image is input, without reading the image two times, by using a correction quantity obtained by a fixed reference color method of FIG. 8 or by a variable reference color method of FIG. 11 and stored in a ROM or the like.

As seen from the above description of the embodiments, by shifting a pixel location where pixels having a skin color of an image exist at a maximum to another pixel location of a skin color having a proper tone, it is possible to automatically perform color correction of a skin color to a proper skin color. Further, by incorporating the region outside the skin color region as an object region to be corrected, a smooth color correction can be achieved.

As an object color to be corrected in the color image processing apparatus, a skin color has been used since it is most sensitive and perceptible to humans and needs to be color-corrected. If color reproduction with high fidelity is desired, any desired color may be used as an object to be corrected.

In the above embodiments, color correction is performed through conversion between RGB values and $L^*$, u' and v' values. However, instead of $L^*$, u' and v', another color space coordinate system may be adopted. Also, RGB, YMC or other data may be used as input image data.

As above, the present invention can achieve a color image processing apparatus capable of judging a necessity of color correction of an image and obtaining a proper color correction quantity.

The present invention is not limited to the above embodiments, but various applications and modifications are possible without departing from the scope of the appended claims.

What is claimed is:

1. A color image processing apparatus comprising:
   generating means for generating color image data;
   measuring means for measuring a number of image data which represent color belonging to a predetermined region of color space and which are generated by said generating means;
   means for obtaining a representative value of color of the image data within said predetermined region;
   means for correcting chromaticity of the color image data based on said representative value and said number measured by said measuring means; and
   means for outputting the corrected color image data to a color image reproducing device.

2. The color image processing apparatus according to claim 1, wherein said correction means corrects the image data when said number is more than a predetermined value.

3. The color image processing apparatus according to claim 1, wherein said correction means determines a correction quantity of the image data based on a difference between said representative value and a reference color.

4. The color image processing apparatus according to claim 1, wherein said correction means corrects all of said image data.

5. The color image processing apparatus according to claim 1, wherein said correction means corrects color image data which represent color within said predetermined region.

6. The color image processing apparatus according to claim 1, wherein said correction means corrects color image data that represent color within an extended region including said predetermined region.

7. The color image processing apparatus according to claim 1, wherein said representative value is a value of color having a maximum appearance within said predetermined region.

8. The color image processing apparatus according to claim 1, wherein said color within said predetermined region is a skin color.

9. The color image processing apparatus according to claim 1, wherein said color image data is represented by L*, u and v.

10. The color image processing apparatus for processing input image data and outputting process image data, comprising:
    measuring means for measuring a number of image data which represent color belonging to a predetermined region of color space;
    means for judging if color correction is to be performed, based on whether said number measured by said measuring means is more than a predetermined quantity;
    means for determining a reference correction quantity when said judging means judges that color correction is to be performed, based on a difference of said image data from a reference chromaticity determined previously with respect to said predetermined region;
    means for correcting chromaticity of said image data using said reference correction quantity added with a weight corresponding to a color distance of said image data from said reference chromaticity; and
    means for outputting the corrected image data to a color image reproducing device.

11. The color image processing apparatus according to claim 10, wherein said difference of said image data from said reference chromaticity is a deviation of a color having a maximum noticeability among colors having chromaticity within said predetermined region from said reference chromaticity.

12. The color image processing apparatus according to claim 10, wherein said color within said predetermined region is a skin color.

13. A color image processing apparatus according to claim 10, wherein said image data is represented by L*, u and v.

14. A color image processing apparatus comprising:
    converting means for converting input color image data into luminance chromaticity information;
    counting means for counting a number of color image data representing color within a predetermined region in color space;
    means for recognizing, in response to a count value counted by said counting means, a coordinate point at which a largest number of color image data are distributed in said predetermined region as a representative value;
    correcting means for determining a distance between a hue represented by a representative value and a predetermined hue and for correcting chromaticity of said input image data based on said determined distance as a correction quantity; and
    means for outputting the corrected color image data to a color image reproducing device.

15. The color image processing apparatus according to claim 14, wherein when the number of said color image data counted by said counting means is larger than a predetermined value, said correcting means executes its correcting operation, and when the number of said color image data counted by said counting means is smaller than said predetermined value, said correcting means does not execute its correcting operation.

16. The color image processing apparatus according to claim 14, wherein said predetermined region is divided into a plurality of partial areas, wherein the number of color image data which exist in each of said partial areas is counted, and wherein a coordinate point of one of said partial areas corresponding to the largest number among the counted numbers is recognized as said representative value.

17. The color image processing apparatus according to claim 14, wherein said color space plane is represented by u and v, and all the image data are represented by $u_n$ and $v_n$, and wherein said correction quantity ($u_n'$, $v_n'$) is obtained as follows:

$$u_n' = u_n - \Delta u$$

$$v_n' = v_n - \Delta v$$

wherein a difference ($\Delta u$, $\Delta v$) between said representative value, represented as ($u_1$, $v_1$), and an intersection ($u_0$, $v_0$) of a line of said predetermined hue with a perpendicular drawn from a coordinate of said representative value ($u_1$, $v_1$) toward the line is obtained by $\Delta u = u_1 - u_0$ and $\Delta v = v_1 - v_0$.

18. The color image processing apparatus according to claim 14, wherein said correcting means corrects input image data in said predetermined region.

19. The color image processing apparatus according to claim 14, wherein a color of said predetermined region is a skin color.

20. A color image processing apparatus comprising:
    converting means for converting input color image data into luminance chromaticity information;
    counting means for counting a number of color image data representing color within a predetermined region in color space;
    means for recognizing, in response to a count value counted by said counting means, a coordinate point at which a largest number of color image data are distributed in said predetermined region as a representative value;
    means for determining a distance between said representative value and predetermined reference value and for recognizing said distance as a correction quantity;
    correcting means for executing a weighting operation with a weight obtained in response to a distance between image data to be corrected and said reference value and for correcting chromaticity of said input image data, wherein said correction quantity is allowed to be changed in response to said weight; and
    means for outputting the corrected image data to a color image reproducing device.

21. The color image processing apparatus according to claim 20, wherein when the number of said color image data counted by said counting means is larger than a predetermined value, said correcting means executes its correcting operation, and when the number of said color image data counted by said counting means is smaller than said predetermined value, said correcting means does not execute its correcting operation.

22. The color image processing apparatus according to claim 20, wherein said predetermined region is divided into a plurality of partial areas, wherein a number of color image data which exist in each of said partial areas is counted, and wherein a coordinate point of one of said partial areas corresponding to a largest number among the counted numbers is recognized as said representative value.

23. The color image processing apparatus according to claim 20, wherein said chromaticity plane is represented by u and v, and a difference ($\Delta u$, $\Delta v$) between said representative value ($u_1$, $v_1$) and an intersection ($u_0$, $v_0$) of a line of said predetermined hue with a perpendicular drawn from a coordinate of said representative value ($u_1$, $v_1$) toward the line is recognized as said correction quantity.

24. The color image processing apparatus according to claim 20, wherein said correcting means executes a correcting operation as follows:

$$u_n' = u_n - \Delta u$$

$$v_n' = v_n - \Delta v$$

wherein ($u_n$, $v_n$) represents input image data in said predetermined region, ($\Delta u$, $\Delta v$) represents said correction quantity and ($u_n'$, $v_n'$) represents said representative value.

25. The color image processing apparatus according to claim 20, wherein said correcting means executes a correcting operation within an extended region encircling said predetermined region such that, as said representative value separates from said predetermined region, said correction quantity ($\Delta u$, $\Delta v$) is decreased, and when said representative value is on an outline of said extended region, said correction quantity becomes zero, and such that said representative value ($u_n'$, $v_n'$) is obtained by subtracting said correction quantity ($\Delta u$, $\Delta v$) from said inputted image data ($u_n v_n$) as follows:

$$u_n' = u_n - \Delta u$$

$$v_n' = v_n - \Delta v.$$

26. The color image processing apparatus according to claim 20, wherein a color of said predetermined region is a skin color.

27. A color image processing method comprising the steps of:
generating color image data;
measuring a number of image data which represent color belonging to a predetermined region of color space and which are generated in said generating step;
obtaining a representative value of color of the image data within the predetermined region;
correcting chromaticity of the color image data based on the representative value and the number measured in said measuring step; and
outputting the corrected color image data to a color image reproducing device.

28. A color image processing method for processing input image data and outputting processed image data, comprising the steps of:
measuring a number of image data which represent color belonging to a predetermined region of color space;
judging if color correction is to be performed, based on whether the number measured in said measuring step is more than a predetermined quantity;
determining a reference correction quantity when it is determined in said judging step that color correction is to be performed, based on a difference of the previously with respect to the predetermined region;
correcting chromaticity of the image data using the reference correction quantity added with a weight corresponding to a color distance of the image data from the reference chromaticity; and
outputting the corrected image data to a color image reproduction device.

29. A color image processing method comprising the steps of:
converting input color image data into luminance chromaticity information;
counting a number of color image data representing color within a predetermined region in color space;
recognizing, in response to a count value counted in said counting step, a coordinate point at which a largest number of color image data are distributed in the predetermined region as a representative value;
determining a distance between a hue represented by the representative value and a predetermined hue and for correcting chromaticity of the input image data based on the determined distance as a correction quantity; and
outputting the corrected image data to a color image reproduction device.

30. A color image processing method comprising the steps of:
converting input color image data into luminance chromaticity information;
counting a number of color image data representing color within a predetermined region in color space;
recognizing, in response to a count value counted in said counting step, a coordinate point at which a largest number of color image data are distributed in the predetermined region as a representative value;
determining a distance between the representative value and a predetermined reference value and for recognizing the distance as a correction quantity;
executing a weighting operation with a weight obtained in response to a distance between image data to be corrected and the reference value and for correcting chromaticity of the input image data, wherein the correction quantity is allowed to be changed in response to the weight; and
outputting the corrected image data to a color image reproduction device.

* * * * *

UNITED STATES PATENT AND TRADEMARK OFFICE
CERTIFICATE OF CORRECTION

PATENT NO. : 5,130,935

DATED : July 14, 1992

INVENTOR(S) : HIDEO TAKIGUCHI

It is certified that error appears in the above-identified patent and that said Letters Patent is hereby corrected as shown below:

COLUMN 1

Line 22, "the" should read --what the-- and "has" should read --should be has--.
    Line 55, "chromatically" should read --chromaticity--.

COLUMN 2

Line 17, "first" should read --first.--.
    Line 37, "the-skin" should read --the skin--.
    Line 67, "Fig. 4." should read --Fig. 1.--.

COLUMN 3

Line 11, "to" should read --to 6--.
    Line 47, "exsits" should read --exists--.
    Line 53, "values number of" should read --value--.
    Line 54, "maximum pixels." should read --the maximum number of pixels.--.
    Line 59, "obtainied" should read --obtained--.
    Line 62, "0.20," should read --(0.20,-- and "0.32," should read --(0.32,--.

COLUMN 4

Line 4, "$v=1/au+b_2$" should read --$v=(1/a)u+b_2$--.
    Line 5, Italics should be deleted.
    Line 44, "16," should read --[16,--.
    Line 45, "20" should read --20]--.

UNITED STATES PATENT AND TRADEMARK OFFICE
CERTIFICATE OF CORRECTION

PATENT NO. : 5,130,935

DATED : July 14, 1992

INVENTOR(S) : HIDEO TAKIGUCHI

It is certified that error appears in the above-identified patent and that said Letters Patent is hereby corrected as shown below:

COLUMN 5

Line 18, "othner" should read --other--.
Line 50, "0.22," should read --(0.22,-- and "0.26," should read --(0.26,--.
Line 51, "0.32," should read --(0.32,--.
Line 52, "$30 \leqq = L^* \leqq 80$." should read --$30 \leqq = L^* \leqq 80$.--.
Line 55, "numbers" should read --number--.
Line 61, "into" should read --into intervals--.
Line 67, "exsits" should read --exists--.

COLUMN 6

Line 19, "<max>u," should read --(<max>u,--.
Line 61, "region 2" should read --region 200--.

COLUMN 7

Line 18, Close up right margin.
Line 19, Close up left margin.
Line 26, "$\Delta u$=<max$\Delta$u-su" should read --$\Delta u$=<max>u-su--.
Line 53, "to the" should read --to the color correction unit 7'. After obtaining the--.

COLUMN 9

Line 13, "The" should read --A--.
Line 14, "process" should read --processed--.
Line 45, "A" should read --The--.

UNITED STATES PATENT AND TRADEMARK OFFICE
CERTIFICATE OF CORRECTION

PATENT NO. : 5,130,935

DATED : July 14, 1992

INVENTOR(S) : HIDEO TAKIGUCHI

It is certified that error appears in the above-identified patent and that said Letters Patent is hereby corrected as shown below:

COLUMN 12

Line 13, "previously" should read --image data from a reference chromaticity determined previously--.

Signed and Sealed this

Fourteenth Day of September, 1993

Attest:

BRUCE LEHMAN

Attesting Officer

Commissioner of Patents and Trademarks